United States Patent [19]
Guillemette et al.

[11] Patent Number: 6,077,062
[45] Date of Patent: Jun. 20, 2000

[54] EXTRUSION DIE SYSTEM WITH BALANCED FLOW PASSAGE

[75] Inventors: Arthur Roger Guillemette, West Warwick, R.I.; James M. Prue, Griswold, Conn.

[73] Assignee: Guill Tool & Engineering Co., Inc., West Warwick, R.I.

[21] Appl. No.: 09/195,463

[22] Filed: Nov. 18, 1998

Related U.S. Application Data

[63] Continuation-in-part of application No. 08/808,512, Feb. 27, 1997, Pat. No. 5,980,226, which is a continuation-in-part of application No. 08/625,779, Mar. 29, 1996, Pat. No. 5,667,818, which is a continuation of application No. 08/148,009, Nov. 5, 1993, abandoned, which is a continuation-in-part of application No. 08/871,916, Jun. 10, 1997, Pat. No. 5,882,694, which is a continuation of application No. 08/625,779, Mar. 29, 1996, Pat. No. 5,667,818, which is a continuation of application No. 08/148,009, Nov. 5, 1993, abandoned.

[51] Int. Cl.[7] ................................................. B29C 47/20
[52] U.S. Cl. ...................... 425/113; 425/192 R; 425/380; 425/461; 425/467
[58] Field of Search ................................. 425/133.1, 113, 425/380, 381, 461, 462, 467, 396, 192 R

[56] References Cited

U.S. PATENT DOCUMENTS

| | | | |
|---|---|---|---|
| 5,069,612 | 12/1991 | Teutsch et al. | 425/133.1 |
| 5,460,771 | 10/1995 | Mitchell et al. | 425/396 |
| 5,538,411 | 7/1996 | Gates | 425/192 R |

*Primary Examiner*—Harold Pyon
*Assistant Examiner*—Joseph Leyson
*Attorney, Agent, or Firm*—Perman & Green, LLP

[57] ABSTRACT

In an extrusion die flow channels supply molten plastic to a pair of distribution grooves constructed in the upstream face of the die component adjacent to the die body. The die body becomes more universal and can be used for a variety of applications by replacing the die component with alternate designs of distribution grooves.

6 Claims, 6 Drawing Sheets

6,077,062

EXTRUSION DIE SYSTEM WITH BALANCED FLOW PASSAGE

This application is a continuation-in-part of application Ser. No. 08/808,512 filed on Feb. 27, 1997, now U.S. Pat. No. 5,980,226, which is a continuation-in-part of application Ser. No. 08/625,779, filed on Mar. 29, 1996, now U.S. Pat. No. 5,667,818, which is a continuation of application Ser. No. 08/148,009 filed on Nov. 5, 1993, now abandoned, and this application is a continuation-in-part of application Ser. No. 08/871,916 filed on Jun. 10, 1997, now U.S. Pat. No. 5,882,694, which is a continuation of application Ser. No. 08/625,779 filed on Mar. 29, 1996, now U.S. Pat. No. 5,667,818, which is a continuation of application Ser. No. 08/148,009 filed on Nov. 5, 1993, now abandoned. The contents of said applications being incorporated herein by reference.

BACKGROUND OF THE INVENTION

It is the purpose of this invention to provide a unique distribution groove for a balanced flow passage used to disperse the molten plastic in an extrusion die evenly within an annular extrusion channel. Die systems, employing balanced flow distribution grooves, are constructed by assembling a series of cylindrical components along a common axis. A continuous flow passage is formed by the cooperation of the adjacent components. The passage may comprise an inlet, a pair of flow channels, a distribution groove, a conical extrusion channel, and an outlet which sequentially communicate to form a continuous passage. It is the purpose of this invention to provide components which have multiple applications and to facilitate the replacement of certain parts of the passage to provide different functions.

SUMMARY OF THE INVENTION

In the extrusion die of this invention, the die body is constructed with an inlet which communicates with a pair of flow channels. The flow channels supply molten plastic to a pair of distribution grooves constructed in the upstream face of the die component adjacent to the die body. The die body can be used for a variety of applications by replacing the die component with alternate designs. In addition the distribution groove of this invention maybe formed by a pair of opposing semi-volute shaped grooves which are spirally nested or enlarged by combination with grooves on the mating faces of the components.

DESCRIPTION OF THE DRAWING

The preferred embodiment of the invention is described in more detail below with reference to the drawing in which.

DESCRIPTION OF THE PREFERRED EMBODIMENT

Figure 1:
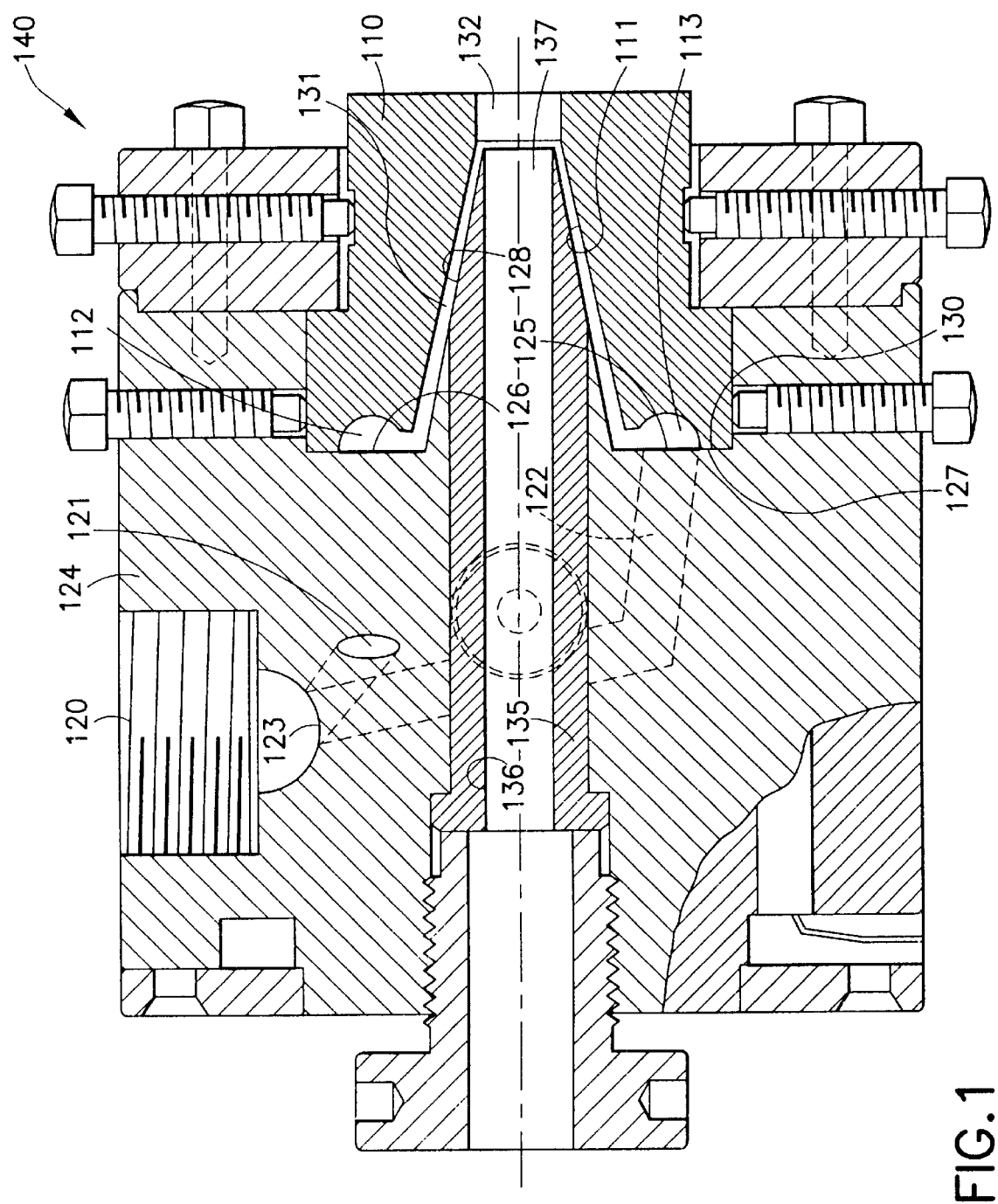
FIG. 1 is a sectional view of an extrusion die system using a distribution groove of this invention.

The extrusion die system 140 of this invention is constructed of a series of components including a die body 124, and a die 110. Each of these components or modules is constructed having a portion of a passage therein. When assembled, the passage portions combine to form a passage extending from an upstream inlet 120 to a downstream outlet 132. The passages of adjacent components communicate to provide a continuous passage for the flow of molten plastic through the die system 140. This passage is constructed to provide a balanced flow of plastic throughout the extrusion channel 131. Although the die system 140 is shown with three components, intermediate modules may be used which have interconnecting passages.

Figure 2:
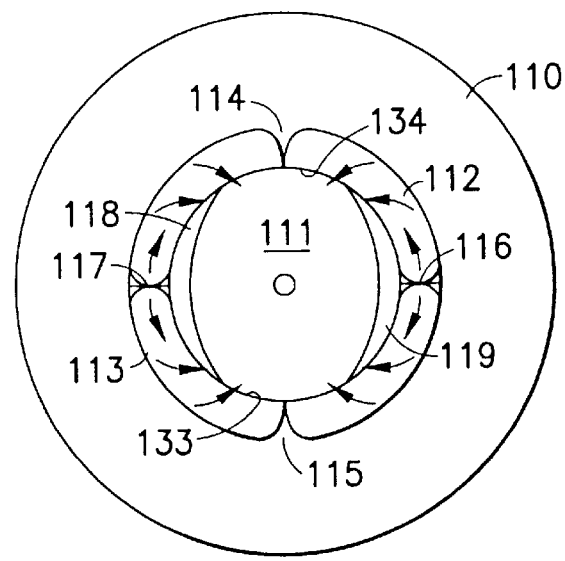
FIG. 2 is an end view of a die module showing a pair of distribution grooves constructed in an upstream face.

The flow passage, as shown in FIGS. 1 and 2, includes an inlet 120, which receives molten plastic from an extruder. Flow channels 121 and 122 are connected to inlet 120 and a divider 123 separates the incoming stream of plastic evenly into the two channels. Flow channels 121 and 122 are constructed in the die body 124 and extend through the die body to outlets 125 and 126 in the downstream face 127. A conical engagement surface 128 extends axially outward from face 127. Die 110 is constructed with a conical bore 111 to receive the conical surface 128. A suitable clearance is provided between surface 128 and the bore 111 to form a tapered extrusion channel 131 between the mating parts of body 124 and die 110. Die 110 is constructed with an upstream face 130 extending radially outward from the conical bore 111.

As shown in FIG. 1, the conical surface 128 may be formed by the cooperation of tip 135 with the body 124. The die body 124 may be constructed with an axial bore 136 adapted to receive the tip 135. A conical surface, which matches surface 128, is formed on the downstream end of the tip 135 and extends outward from the die body 124 to form an extended conical surface in conjunction with surface 128 of body 124. The tip may be constructed with an axial bore 137 to allow an elongated element to pass through the die for coating.

Figure 3:
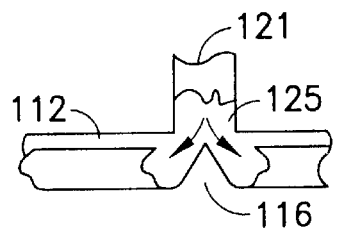
FIG. 3 is a schematic, cut away view of the entrance to the distribution groove of FIG. 2.

A pair of distribution grooves 112 and 113 are formed in the upstream face 130, as shown in FIG. 2. Distribution grooves 112 and 113 are substantially semicircular in cross section and surround the bore III in a symmetrical manner. As shown in FIG. 3, divider dams 116 and 117 are formed transverse to the longitudinal axis of the grooves midway between the ends 114 and 115. The dams 116 and 117 are positioned to align with the outlets 125 and 126 of the die body 124. The ends 114 and 115 of the grooves 112 and 113 are formed as curved dams to direct the flow of molten plastic over the downstream edges 133 and 134 of the grooves 113 and 112 respectively. The die body 124 is coaxially assembled with the die 110 with the face 127 of the former engaging the face 130 of the latter (see FIG. 1). The two components, 110 and 124, cooperate to form a continuous passage consisting of inlet 120, flow channels 121 and 122, outlets 125 and 126, grooves 112 and 113, conical extrusion channel 131, and outlet 132. The grooves 112 and 113 form a chamber in cooperation with the face 127 of the die body 124. It should be clear that additional modules, such as a tip die, not shown, can be added to provide multiple layers. In this instance, the distribution grooves 112 and 113 would be constructed in the upstream face of the tip die. Also, depending on the application, intermediate components may be employed having appropriate passages to maintain the continuity of the extrusion passage 120 to 132.

As shown in FIG. 3, flowing plastic exits the outlets 125 and 126 and is separated into two streams by divider dams 116 and 117 (see flow arrows of FIGS. 2 and 3). To encourage the plastic to evenly fill the grooves 112 and 113, flat dams 118 and 119 are constructed on the downstream edges 133 and 134 at the divider dams 116 and 117. Dams 118 and 119 act to restrict the flow of plastic over the downstream edges 133 and 134 of the grooves 112 and 113 as the plastic enters the groove chambers. This promotes a balanced flow into the extrusion channel 131.

Figure 4:
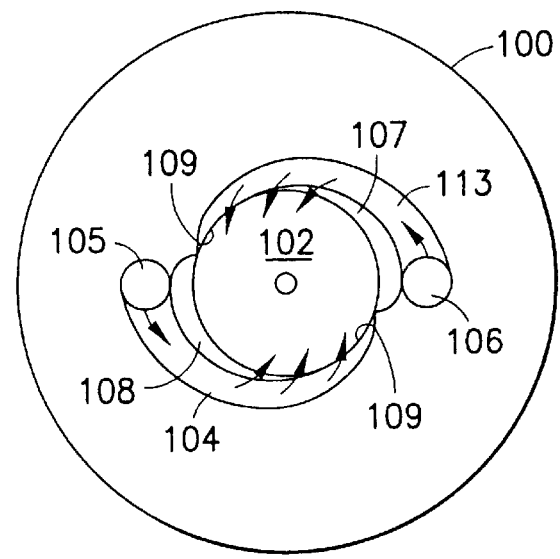
FIG. 4 is an end view of a die using a spirally nested distribution groove.
Figure 5:
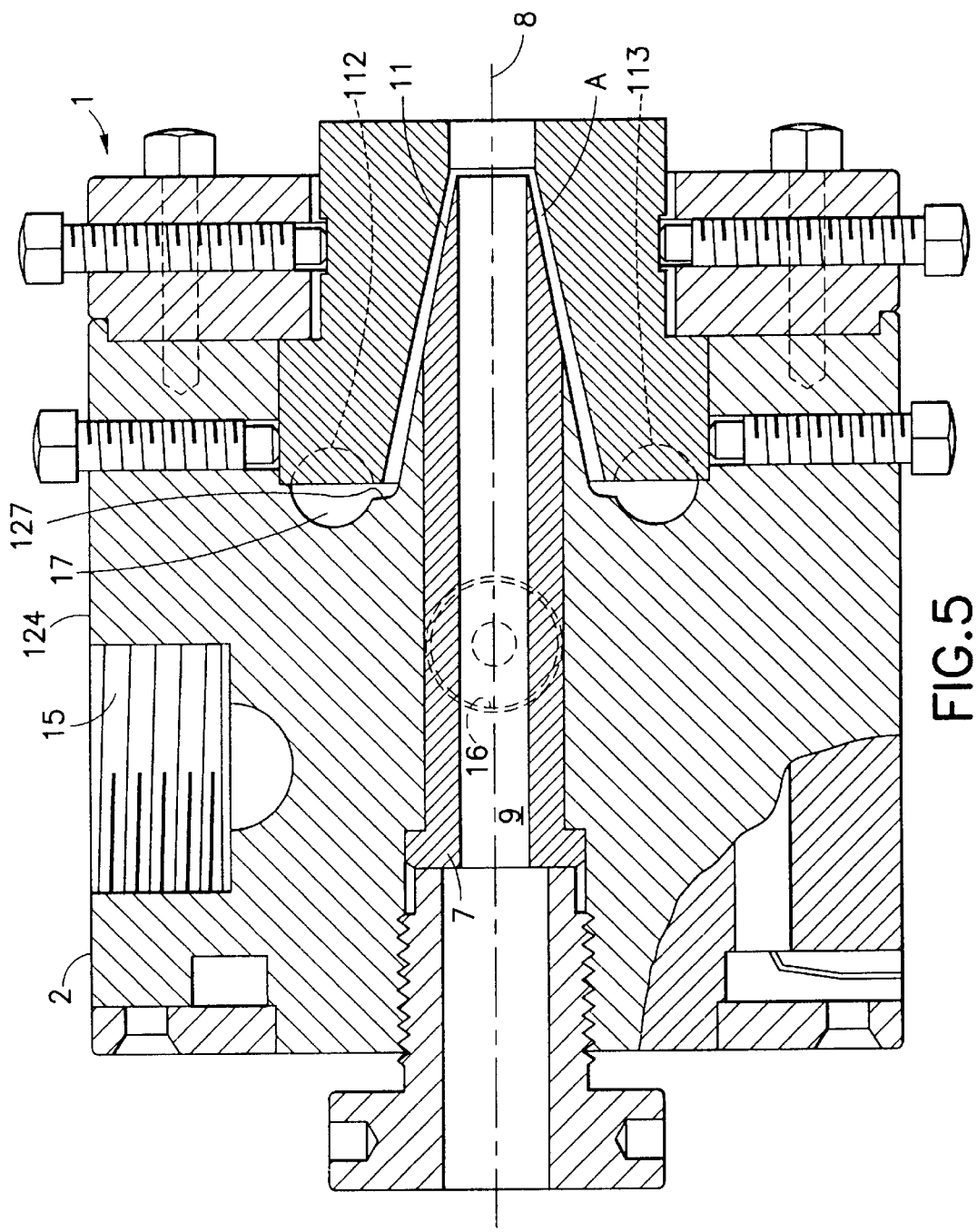
FIG. 5 is a sectional view, through the axis of a die assembly showing a three component die system having a balanced flow passage.
Figure 7:
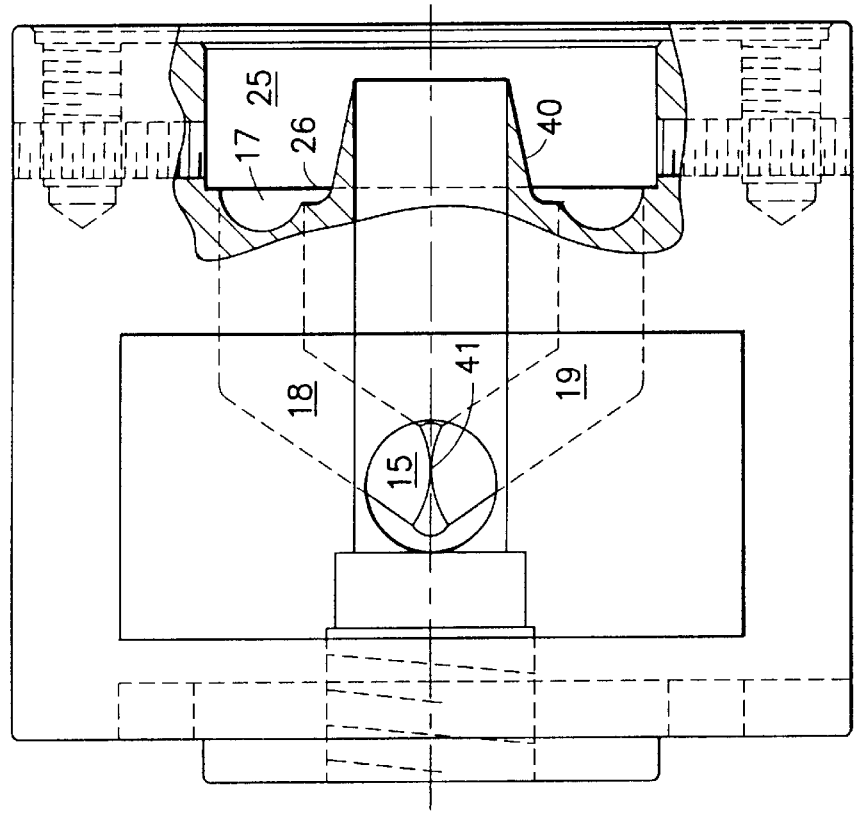
FIG. 7 is a side view of the die body of FIG. 5 showing the balanced flow passage.
Figure 6:
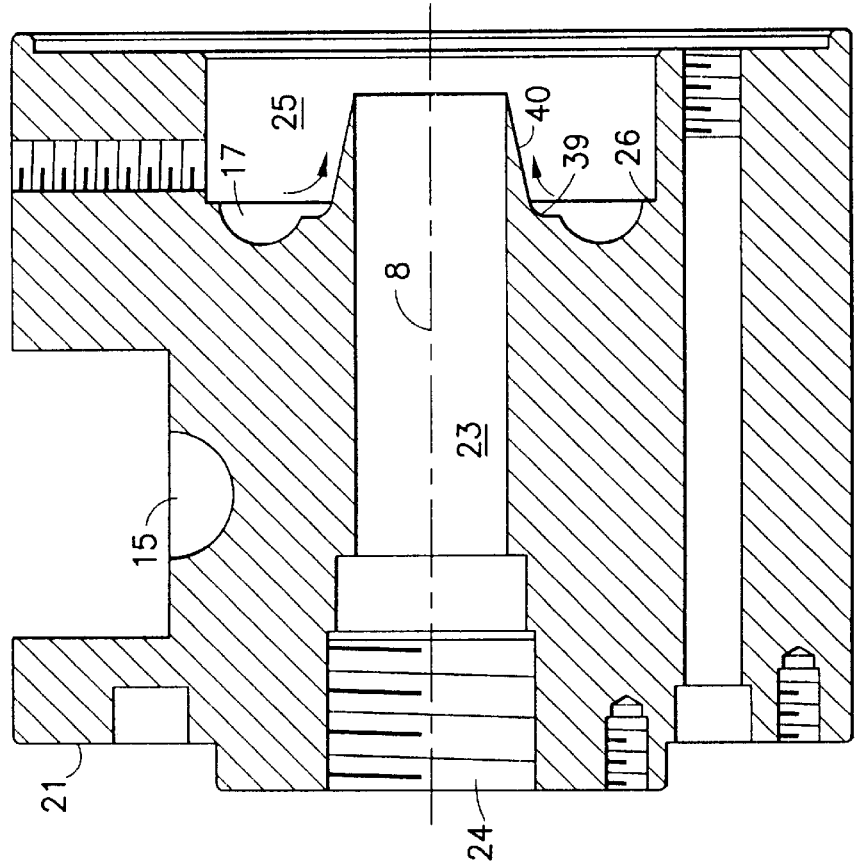
FIG. 6 is a sectional view of the die body of FIG. 5.

In an alternate embodiment, a pair of spirally nested distribution grooves 103 and 104 are constructed in the upstream face of a die 100 as shown in FIG. 4, in place of the annular semi-cylindrical grooves 112 and 113. The grooves 103 and 104 are formed in the shape of a semi-volute. In the configuration shown in FIG. 4, the downstream edges 109 of the grooves merge with a conical bore 102. Grooves 103 and 104 have entrances 105 and 106 and gradually taper inward to merge into the downstream edge 109. To encourage the flow of plastic to fill the grooves, each of the downstream edges 109 is constructed with flat dams 107 and 108 which also taper inward in the downstream direction, as shown in FIG. 4. The entrances 105 and 106 are aligned with the outlets 125 and 126 of the die body 124 when the die 100 is assembled therewith. Flowing plastic will enter the grooves 103 and 104 and disperse counter clockwise, as shown by the flow arrows of FIG. 4, over the downstream edge 109. It has been found that this alternate embodiment performs comparably with other balanced groove designs and in some conditions enhances the balanced distribution of plastic to the extrusion channel 131. A spirally nested groove, as shown in FIG. 4, may also be constructed on face 127 of the die body 124 in direct communication with the flow channels 121 and 122.

Figure 10:
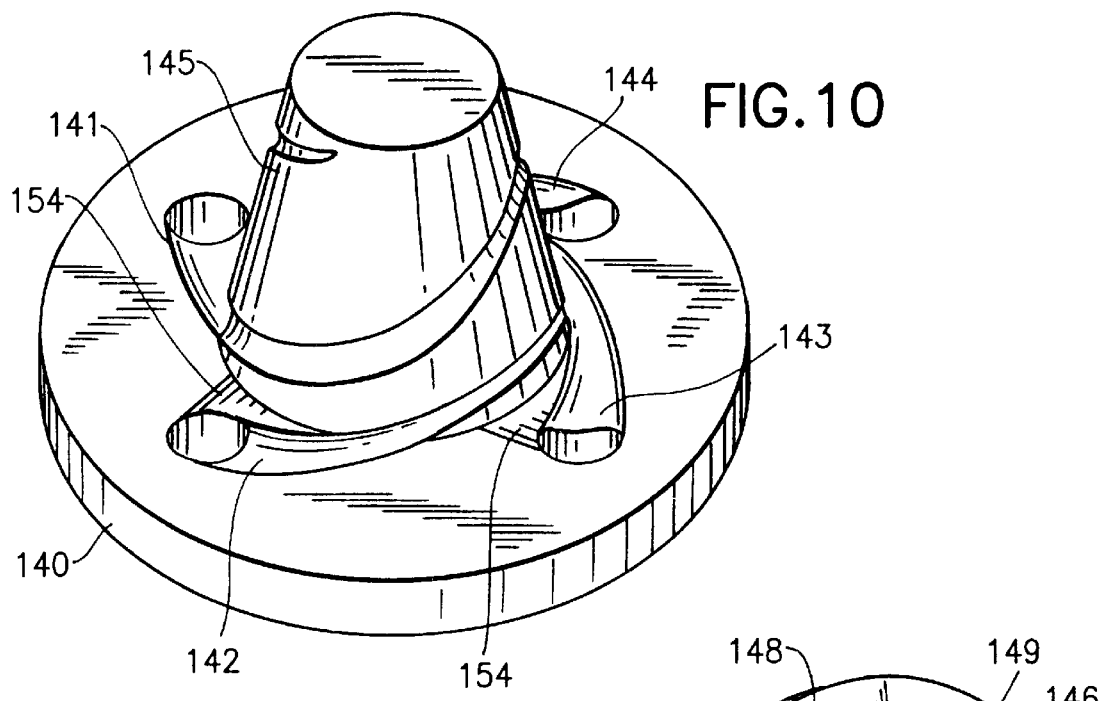
FIG. 10 is a perspective view of a die module showing 2 pairs of spirally nested distribution grooves.

Although, the spiral grooves are shown in FIG. 4 as contained within the plane of the upstream face of the die 100, under some circumstances it may be desirable that the grooves 103 and 104 be pitched downstream about the surface of the associated extrusion passage as shown in FIG. 10. In the embodiment shown in FIG. 10, a series of symmetrically positioned (nested) semi-volute shaped grooves, 141, 142, 143, and 144 are constructed in the downstream face of a die module 140. The module 140 has a truncated conical mating surface 145 which mates with a complimentary surface of the immediately adjacent downstream module (not shown) to form an extrusion channel. The grooves 141–144 will therefore extend into the extrusion channel thus formed. A dam 154 separates the upstream end of each of the spiral grooves from the extrusion channel and tapers gradually downstream to encourage the spiral flow. It has been found that such a configuration will further balanced the flow of plastic evenly throughout the extrusion channel. In addition there will be beneficial effects from the spiraling motion imparted to the plastic. An effect occurs that is similar to the rifling of a gun barrel and the plastic will take on a spiral flow with an associated enhancement of bending strength and durability of the resulting tubular product.

Figure 11:
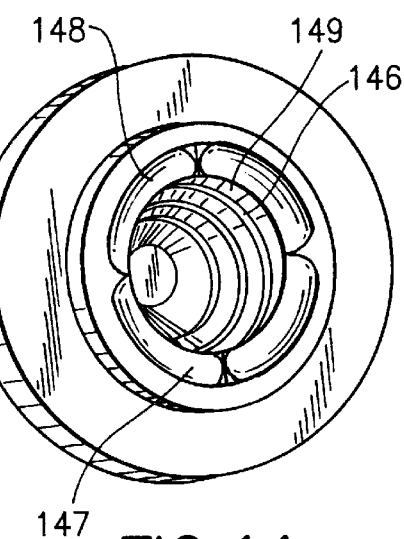
FIG. 11 is a perspective view of a die module constructed with spiral grooves in the extrusion channel.
Figure 12:
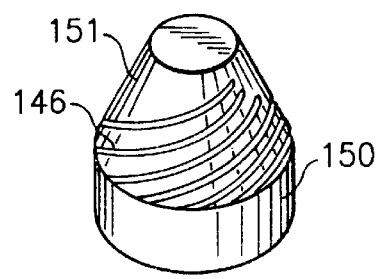
FIG. 12 is a perspective view of a second embodiment of a die module constructed with spiral grooves in the extrusion channel.
Figure 13:
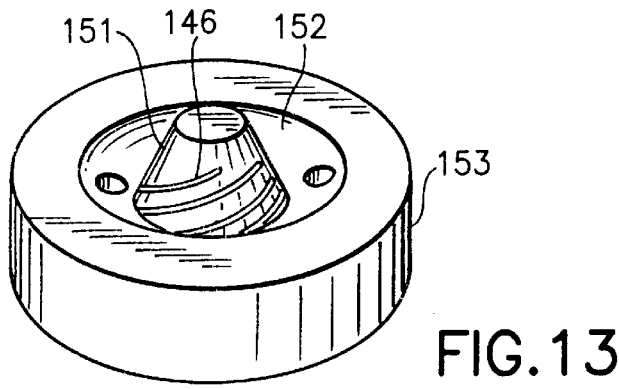
FIG. 13 is a perspective view of a die module having a distribution groove communicating with spiral grooves constructed to extend into the extrusion channel.

To accomplish the rifling motion, a series of spiral grooves may be constructed in the mating parts of a extrusion die system that form the extrusion channel, as shown in FIGS. 11–13. In FIG. 11 a series of spiral grooves 146 are shown constructed on the interior of a conical bore 149 being fed by a pair of distribution grooves 147 and 148 of a balanced flow system as previously described. In FIG. 12 the spiral grooves 146 are formed on the conical surface 151 of a die module 150. FIG. 13 shows the element 150 assembled in communication with a distribution groove 152 formed in the die module 153.

The proper operation of die system 140 requires that a balanced flow be maintained throughout. Such a system is further described in the above referenced application in which, as shown in FIGS. 5–9, a die assembly 1 is constructed with a balanced flow passage starting with inlet 15 which receives molten plastic from an extruder (not shown). Primary flow channels 18 and 19 communicate with inlet 15 to deliver molten plastic to distribution groove 17. Distribution groove 17 in die body 2 receives flowing plastic directly from flow channels 18 and 19 through outlets 27 and 28 (see FIG. 9). The flow channels 18 and 19 diverge to avoid intersection with the axial bore 23. To enhance the even distribution of plastic into both channels, a flow dividing wedge 41 is constructed at the junction of the two channels.

Figure 9:
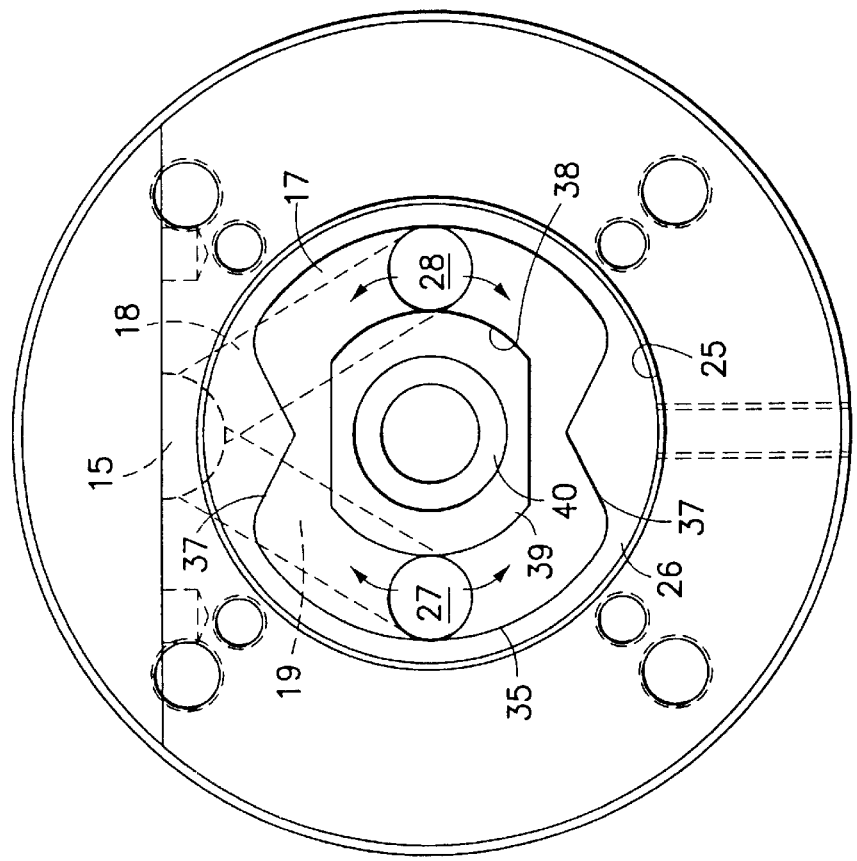
FIG. 9 is an end view of the die body of FIG. 5 showing the distribution groove.
Figure 8:
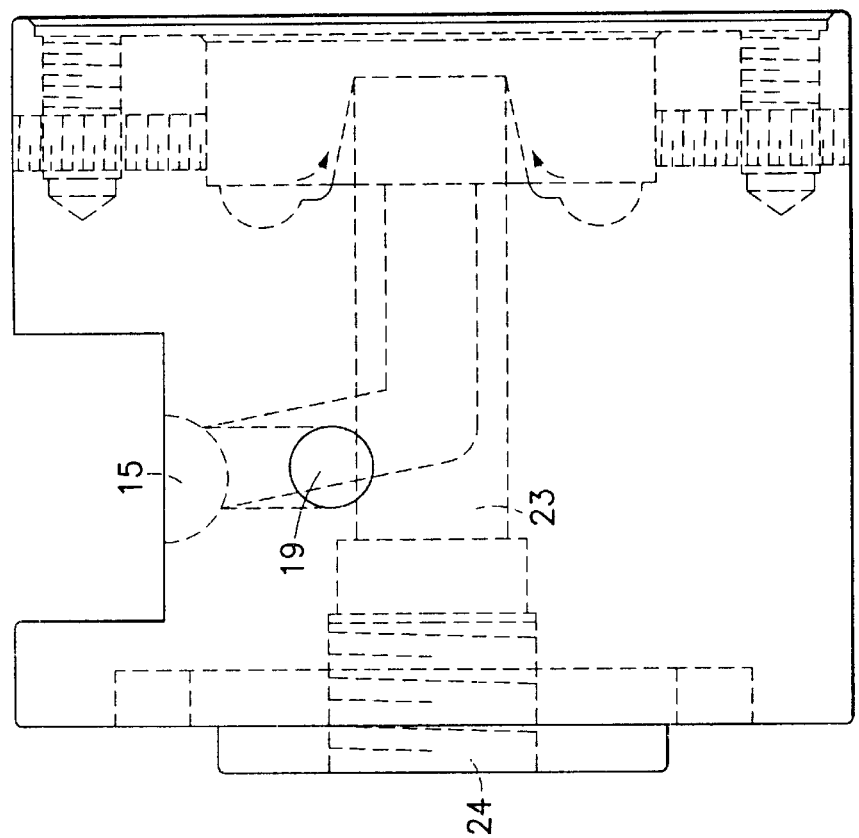
FIG. 8 is a top view of the die body of FIG. 5, showing the balanced flow passage.

Another embodiment of a distribution Groove 17 is shown in FIG. 9 as a single annular groove that generates two opposing flows and has a substantially semi-circular cross section. This groove generates a flow pattern which is equivalent to the pair of grooves 112 and 113 shown in FIG. 2. Groove 17 is constructed in die body 2 on face 26 of recess 25 and extends in a plane generally transverse to the axis 8 of the die assembly 1. The groove inlets 27 and 28 are positioned one hundred and eighty degrees apart to receive molten plastic. Distribution groove 17, as shown in FIG. 9, has an upstream circumferential edge 35 in which are constructed two symmetrically placed blending wedges 37 extending into the groove to encourage movement of molten plastic in the groove radially inward. The blending wedges 37 are positioned equidistant from the inlets 27 and 28 where the opposing flows meet. The downstream edge 38 of the groove 17 consists of a flat land 39 merging into the conical surface 40 which in turn merges with conical surface 11 of tip 7. To enhance the distribution function of the groove 17, the land 39 is constructed of diminished width and/or height in the area of the blending wedge 37, away from the inlets, so that the downstream edge 38 merges more directly into the conical surface 40 opposite the blending wedges 37 and operates to restrict the flow of plastic over the edge 38 in the vicinity of the inlets.

Flowing plastic is introduced to the groove 17 symmetrically by the flow channels 19. The plastic flow diverges in opposite directions around the groove 17 as shown by the arrows in FIG. 9. Since the downstream edge 38 is of lesser height than the upstream edge 35, an annular opening is formed. The molten plastic therefore flows over the edge 38 to the conical surface 40 as shown by the arrows in FIGS. 6 and 8. Because of the extended width of the land 39 of the edge 38 in the vicinity of the inlets 27 and 28, plastic flow over the edge 38 is restricted at the inlet and the groove tends to fill with plastic. The flow extends evenly over the edge 38 to create an even distribution of plastic in the conical extrusion channel A. Blending wedges 37 tend to direct the flow of plastic into channel A, over the land 39 at its thinnest area first, thereby allowing the distribution groove 17 to fill. This further enhances the balanced distribution of the molten plastic. Together the flow channels 19 and distribution groove 17 form a balanced flow passage with extrusion channel A for a first layer of plastic.

The balanced flow passage of the various extrusion die systems shown herein function similarly. As shown in FIG. 1, the passage consists of inlet 120, flow channels 121 and 122, and the pair of distribution grooves 112 and 113 in communication with the extrusion channel 131. The die body 124 becomes a more universal module for different applications with the distribution groove removed (see the die body 2 of FIG. 5). The die 110 may be changed depending on the application or the viscosity of the molten plastic. It is advantageous under some circumstances to form an enlarged pair of distribution grooves by constructing a mating pair in the downstream face 127 of die body 124 in a manner similar to the single distribution groove 17, shown in the die body 2 of FIG. 5. For reference, the mating distribution grooves 112 and 113 are shown in phantom in FIG. 5 to illustrate this embodiment. This provides a simple and effective way of increasing the flow volume of the distribution groove to a full cylindrical cross section.

We claim:

1. A modular die assembly for extruding plastic, said plastic flowing through the die assembly from upstream to downstream in a balanced flow passage, comprising:
   a first module having an upstream face, a downstream face, and an outer periphery, and having a plurality of flow channels constructed therein, said flow channels including a common inlet to receive flowing plastic therein and separated outlets constructed in said downstream face to allow flowing plastic to exit therefrom;
   a second module having an upstream face constructed to engage the downstream face of the first module and constructed to form an extrusion channel; and
   a plurality of distribution grooves constructed in one of said engaging downstream and upstream faces in communication with the outlets of said flow channels to receive flowing plastic therefrom, each of said distribution grooves comprising:
      a semi-volute shaped chamber, nested in communication with the extrusion channel and tapered inward from an upstream end to a downstream end, said upstream end being in communication with one of the outlets of the flow channels; said chamber formed in cooperation with the upstream face of the second module;
      each of said chambers having a downstream edge communicating with said extrusion channel to allow said extrusion channel to receive flowing plastic therefrom, said downstream edge being constructed with means to restrict the flow of plastic into the extrusion channel in the area of the outlets of the flow channel.

2. A modular die assembly for extruding plastic, said plastic flowing through the die assembly from upstream to downstream in a balanced flow passage, as described in claim 1, wherein the means to restrict the flow of plastic is comprised of a land which extends substantially radially a distance to meet the extrusion channel, wherein said distance is greater at the upstream end of the groove aligned with the flow channel outlet than at the downstream end thereof.

3. A modular die assembly for extruding plastic, said plastic flowing through the die assembly from upstream to downstream in a balanced flow passage, as described in claim 1, wherein the distribution grooves are constructed in the upstream face of said second module.

4. A modular die assembly for extruding plastic, said plastic flowing through the die assembly from upstream to downstream in a balanced flow passage, as described in claim 1, wherein the semi-volute shaped chamber extends downstream with a pitch as well as a taper into said extrusion channel.

5. A modular die assembly for extruding plastic, said plastic flowing through the die assembly from upstream to downstream in a balanced flow passage, as described in claim 1, wherein said extrusion channel is formed by cooperative engagement of first and second conical surfaces and further comprising at least one groove constructed in one of said first and second conical surfaces, said at least one groove extending in a spiral pattern on said surface.

6. A modular die assembly for extruding plastic, said plastic flowing through the die assembly from upstream to downstream in a balanced flow passage as described in claim 5, wherein the at least one groove, comprises a series of grooves positioned symmetrically about said surface and extending downstream on said surface with a common pitch.

* * * * *